US008689002B2

(12) United States Patent
Yamamoto

(10) Patent No.: US 8,689,002 B2
(45) Date of Patent: Apr. 1, 2014

(54) PERIPHERAL DEVICE, NETWORK SYSTEM, COMMUNICATION PROCESSING METHOD

(75) Inventor: Norihiro Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 142 days.

(21) Appl. No.: 13/011,262

(22) Filed: Jan. 21, 2011

(65) Prior Publication Data

US 2011/0185183 A1    Jul. 28, 2011

(30) Foreign Application Priority Data

Jan. 27, 2010    (JP) .................................. 2010-015756

(51) Int. Cl.
| | | |
|---|---|---|
| G06F 21/00 | (2013.01) | |
| G06F 21/33 | (2013.01) | |
| G06F 21/35 | (2013.01) | |
| H04L 29/06 | (2006.01) | |

(52) U.S. Cl.
CPC ................ *G06F 21/33* (2013.01); *G06F 21/35* (2013.01); *H04L 63/0823* (2013.01)
USPC .......................................... 713/182; 726/17

(58) Field of Classification Search
CPC ....... G06F 21/33; G06F 21/35; G06F 21/604; G06F 21/608; G06F 2221/2101; H04L 63/20; H04L 63/0823; H04L 2209/60; H04L 2209/805; H04L 12/581; H04L 12/5855
USPC .................... 713/156, 158, 173, 182; 726/17; 705/39, 64; 235/380
See application file for complete search history.

(56) References Cited

U.S. PATENT DOCUMENTS

| | | | |
|---|---|---|---|
| 6,834,795 B1 | 12/2004 | Rasmussen et al. | |
| 6,880,084 B1 * | 4/2005 | Brittenham et al. | 713/173 |
| 7,546,259 B1 * | 6/2009 | Manton | 705/35 |
| 2005/0210241 A1 * | 9/2005 | Lee et al. | 713/158 |
| 2006/0208066 A1 * | 9/2006 | Finn et al. | 235/380 |
| 2007/0186098 A1 * | 8/2007 | Lingmann | 713/158 |
| 2007/0260877 A1 * | 11/2007 | Adams et al. | 713/156 |

(Continued)

FOREIGN PATENT DOCUMENTS

| | | |
|---|---|---|
| DE | 10 2007 012 966 | 9/2008 |
| JP | 09-223210 | 8/1997 |

(Continued)

OTHER PUBLICATIONS

Paul Adare.: "Multiple smartcardlogon certificates on the token", Eggheadcafe.com, Nov. 16, 2007, Retrieved from the Internet: URL: http://www.eggheadcafe.com/software/aspnet/31142762/muitiple-smartcardlogon-certificates-on-the-token.aspx (retrieved on May 11, 2011).

(Continued)

*Primary Examiner* — Farid Homayounmehr
*Assistant Examiner* — Maung Lwin
(74) *Attorney, Agent, or Firm* — IPUSA, PLLC

(57) ABSTRACT

A peripheral device includes an interface for connection to a wired or wireless LAN, a local interface for wireless connection, and a control unit configured to check a legitimacy of a user based on a user-specific certificate stored in a communication-function-equipped device upon being accessed through the local interface by the communication-function-equipped device using near-field wireless communication, and to allow a predetermined process to be performed upon successful authentication of the legitimacy.

16 Claims, 14 Drawing Sheets

(56) References Cited

U.S. PATENT DOCUMENTS

| | | |
|---|---|---|
| 2008/0005086 A1* | 1/2008 | Moore .............................. 707/3 |
| 2008/0218498 A1* | 9/2008 | Yoshioka et al. ............. 345/204 |
| 2008/0218805 A1* | 9/2008 | Dokuni ........................ 358/3.28 |
| 2008/0219444 A1 | 9/2008 | Benteo et al. |
| 2009/0036164 A1* | 2/2009 | Rowley ......................... 455/558 |
| 2009/0254483 A1* | 10/2009 | Barkan .......................... 705/64 |

FOREIGN PATENT DOCUMENTS

| | | |
|---|---|---|
| JP | 2005-260759 | 9/2005 |
| JP | 2009-159053 | 7/2009 |
| WO | WO2006/129251 | 12/2006 |
| WO | WO 2006129251 A2 * | 12/2006 ............. G06F 21/00 |
| WO | WO2008/110589 | 9/2008 |

OTHER PUBLICATIONS

Anonymous: "Xindows xp login history.", soft32.com, Nov. 16, 2006, Retrieved from the Internet: URL: http://forum.soft32.com/win4/Windows-xp-login-history-ftopict175956.html (retrieved on May 11, 2011).

Extended European search report dated Jun. 17, 2011.

PKI for Corporate Systems Takanori Tsukada, Nikkei BP, Dec. 25, 2001, First edition, pp. 74-76.

* cited by examiner

PERIPHERAL DEVICE, NETWORK SYSTEM, COMMUNICATION PROCESSING METHOD

BACKGROUND OF THE INVENTION

1. Field of the Invention

The disclosures herein relate to peripheral devices including an image forming apparatus provided with an authentication function utilizing near-field data communication, a network system in which such peripheral devices are connected through a wired or wireless network, a communication processing method involving authentication of the peripheral devices, and a communication control program for causing a computer to perform communication control implemented by the communication processing method.

2. Description of the Related Art

In recent years, IC cards or the like utilizing a near-field communication technology (hereinafter referred to as NFC) has been increasingly used as ID cards in employee ID cards, student ID cards, commuter passes, mobile wallets, and the like for identifying individuals. The standard referred to as NFC is a communication protocol that uses electromagnetic induction in a 13.56-Hz frequency band, and is used for close-range communication with relatively low speed. A maximum range of communication is approximately 10 cm. This standard is defined by NFC IP-1 (ISO/IEC18092) and NFC IP-2 (ISO/IEC214841). The functions of NFC include a card emulation function, a reader/writer emulation function, a inter-terminal communication function, and also include extended functions such as an NFC inter-terminal pairing function, and a Bluetooth handover function.

The card emulation function allows an operation as a non-contact IC card, thereby serving as IC cards and tags conforming to the FeliCa standard, the TypeA standard, the TypeB standard, and RFID (i.e., ISO15693 standard). The reader/writer emulation function allows an operation as a reader/writer, thereby making it possible to read and write IC cards and tags conforming to the above-noted standards. With this function, information is transferred by holding a mobile phone or PDA (personal digital assistant) with an NFC-embedded smart-card chip over an IC or tag conforming to these standards. The inter-terminal communication function allows data exchanges between NFC-compliant devices. The NFC inter-terminal pairing function allows only pairing or authentication between NFC-compliant devices to be performed by NFC, and allows vast amount of data to be transferred by use of some other high-speed standard after the pairing or authentication. The Bluetooth handover function allows only pairing or authentication between NFC-compliant devices to be performed by NFC, and then allows a vast amount of data to be exchanged by use of Bluetooth. There is a similar function referred to as a Wi-Fi handover function.

In the field of computer technology, NFC-equipped IC cards are utilized to limit the people who can use a particular device, and are also utilized for pairing or association in a network. There have also been suggestions that NFC may be utilized not only for computers but also for security-conscious network pairing or association with respect to office equipment having multiple functions such as copier and facsimile functions.

The use of wireless transmission results in a radio wave reaching a wide area. Thus, wireless communication has a problem in that security is undermined in data transmission between devices unless a recipient device is correctly specified. NFC with a communication range of approximately 10 cm is not free from this problem. In consideration of this, a digital certificate that is stored in a protected area referred to as a token is utilized in IC cards or the like. This token is specifically referred to as an NFC token when used in NFC.

There are various types of NFC tokens. In a majority of these types, information required to use a device is read from a memory area within an NFC token. An authentication process is then performed through IC-card authentication, pairing-encryption-based pairing, or association for establishing a safe communication path by exchanging and sharing information about an encryption method and an encryption key, for example, prior to the commencement of communication, thereby attaining high-level security. An additional function may be provided to perform mutual authentication between the NFC token and the device at the time of accessing the above-noted memory area that stores information. Setting information necessary to establish network connection and information necessary to authenticate individuals are stored in the NFC token, and may be acquired by the device. An area for storing the information in the NFC token may vary depending on the function to be used.

Further, an NFC token which stores certificate information has also been used. There may be cases in which the certificate is used as a trigger for security functions provided for the function to be used. There has been a suggestion that the above-noted arrangement is used to provide security for a communication path of network functions or to check whether electronic data is safe and legitimate by using a signature attached thereto.

A technology relating to such security systems is disclosed in Patent Document 1 (Japanese Patent Application Publication No. 9-223210). This technology is aimed at achieving the safe management of keys that are used to authenticate digital signatures or the like in a network. A public key and private key used in a public key cryptosystem required for the RSA signature law or the like are stored in an IC card as a public key certificate and a private key. The public key certificate is comprised of a public key and a digital signature for the public key issued by a CA (certificate authority). A sender receives the IC card from the CA through an offline channel, and inserts the IC card to a network terminal to create a digital signature by use of the private key. A message accompanied by the digital certificate and the public key certificate are sent to a recipient. The recipient checks the authenticity of the CA's signature on the public key certificate by use of the CA's public key that is received through a different channel. Then, the sender's signature is authenticated by use of the sender's public key that has just been authenticated.

Patent Document 2 (Japanese Patent No. 3761432) also discloses a relevant technology. This technology is aimed at reducing the load required for authenticity check of a user's CA certificate and also aimed at preventing a theft of a CA certificate that is being transmitted. An IC card that stores a CA certificate and identification information is distributed to a user. An authentication system that keeps authentication system certificates corresponding to respective identifications reads the IC card through a user terminal. Upon receiving the identification information, the authentication system issues an authentication system certificate corresponding to the received identification information. The user checks the authenticity of the authentication system by use of the authentication system certificate.

Patent Document 3 (Japanese Patent Application Publication No. 2009-159053) also discloses a relevant technology. This technology is aimed at properly managing digital certificates in an environment in which a plurality of applications using digital certificates are in existence. An information processing apparatus having a plurality of applications that perform communication by use of digital certificates includes a management unit that manages links between these applications and digital certificates. The digital certificates are properly managed through an arrangement that a given application uses a digital certificate linked thereto by the management unit.

Patent Document 4 (Japanese Patent Application Publication No. 2005-260759) also discloses a relevant technology. This technology is aimed at providing an electronic signature and a signature check system that does not need to have a certificate, thereby eliminating problems associated with a processing capacity and processing load. On behalf of and upon instructions from client terminals, a proxy apparatus keeps certificates for users (i.e., clients) who use these client terminals. In order to prove the authenticity of a sender's signature to a recipient, the sender's certificate or a set of the sender's certificate and the certificate authority's certificate is presented to the recipient. At the time of checking the recipient's electronic signature, also, a certificate or the validity of the certificate are checked. Further, the results of the check are reported through encryption to the sender. The client terminal includes a processing unit for encrypting and decrypting the sender's electronic signature and a recording medium for storing an encryption key or a decryption key for the sender's electronic signature.

In the related arts described above, an IC card is used as a private key. Alternatively, an IC card that stores a CA certificate and identification information is used. Alternatively, a management unit is provided that manages links between applications and respective digital certificates. Alternatively, on behalf of and upon instructions from client terminals, a proxy apparatus keeps certificates for users (i.e., clients) who use these client terminals. The client terminal includes a processing unit for encrypting and decrypting the sender's electronic signature and a recording medium for storing an encryption key or a decryption key for the sender's electronic signature.

In these technologies, one certificate for one device or certificates for respective functions of this device are installed and stored in the device's RAM disc or HDD. These certificates are used with respect to the device or functions, thereby encrypting a communication path or authenticating electronic data.

In such authentication methods, each certificate is unique for each device or each function. When this certificate is leaked and misused, there is a risk of the security of the device or functions being undermined. For example, a certificate specific to a device and used in common for the functions of the device may be installed in the device. A malicious user may then steal the certificate directly from the device or through a network. In such a case, information may be leaked or tampered with through the misuse of the certificate.

Accordingly, it may be desired to prevent such misuse and to improve network security and data security for each individual using a device.

SUMMARY OF THE INVENTION

In one embodiment, a peripheral device includes an interface for connection to a wired or wireless LAN, a local interface for wireless connection, and a control unit configured to check a legitimacy of a user based on a user-specific certificate stored in a communication-function-equipped device upon being accessed through the local interface by the communication-function-equipped device using near-field wireless communication, and to allow a predetermined process to be performed upon successful authentication of the legitimacy.

In one embodiment, a network system includes a network including one of a wired LAN and a wireless LAN, and a peripheral device connected to the network, wherein the peripheral device includes an interface for connection to the wired or wireless LAN, a local interface for wireless connection, and a control unit configured to check a legitimacy of a user based on a user-specific certificate stored in a communication-function-equipped device upon being accessed through the local interface by the communication-function-equipped device using near-field wireless communication, and to allow a predetermined process to be performed upon successful authentication of the legitimacy.

In one embodiment, a method of processing communication for a peripheral device, which includes an interface for connection to a wired or wireless LAN and a local interface for wireless connection, includes checking a legitimacy of a user based on a user-specific certificate stored in a communication-function-equipped device upon being accessed through the local interface by the communication-function-equipped device using near-field wireless communication, and allowing a predetermined process to be performed upon successful authentication of the legitimacy.

According to at least one embodiment, provision is made to prevent misuse and to improve network security and data security for each individual using a device.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In encrypted communication performed by an image forming apparatus such as a printer or multifunctional device, an NFC token is mainly used for pairing, association, or user authentication. As an extension of such use, certificate information used for user authentication is used to certify or check authenticity for encrypting a network communication path, for providing security to electronic data, and for preventing tampering. Namely, in order to certify or check authenticity for encrypting a network communication path, for providing security to electronic data, and for preventing tampering, certificate data specific to each device or function is not used, but a certificate specific to each user who uses a memory device such as an NFC token is used.

In the following, embodiments of the present invention will be described with reference to the accompanying drawings.

Figure 1:
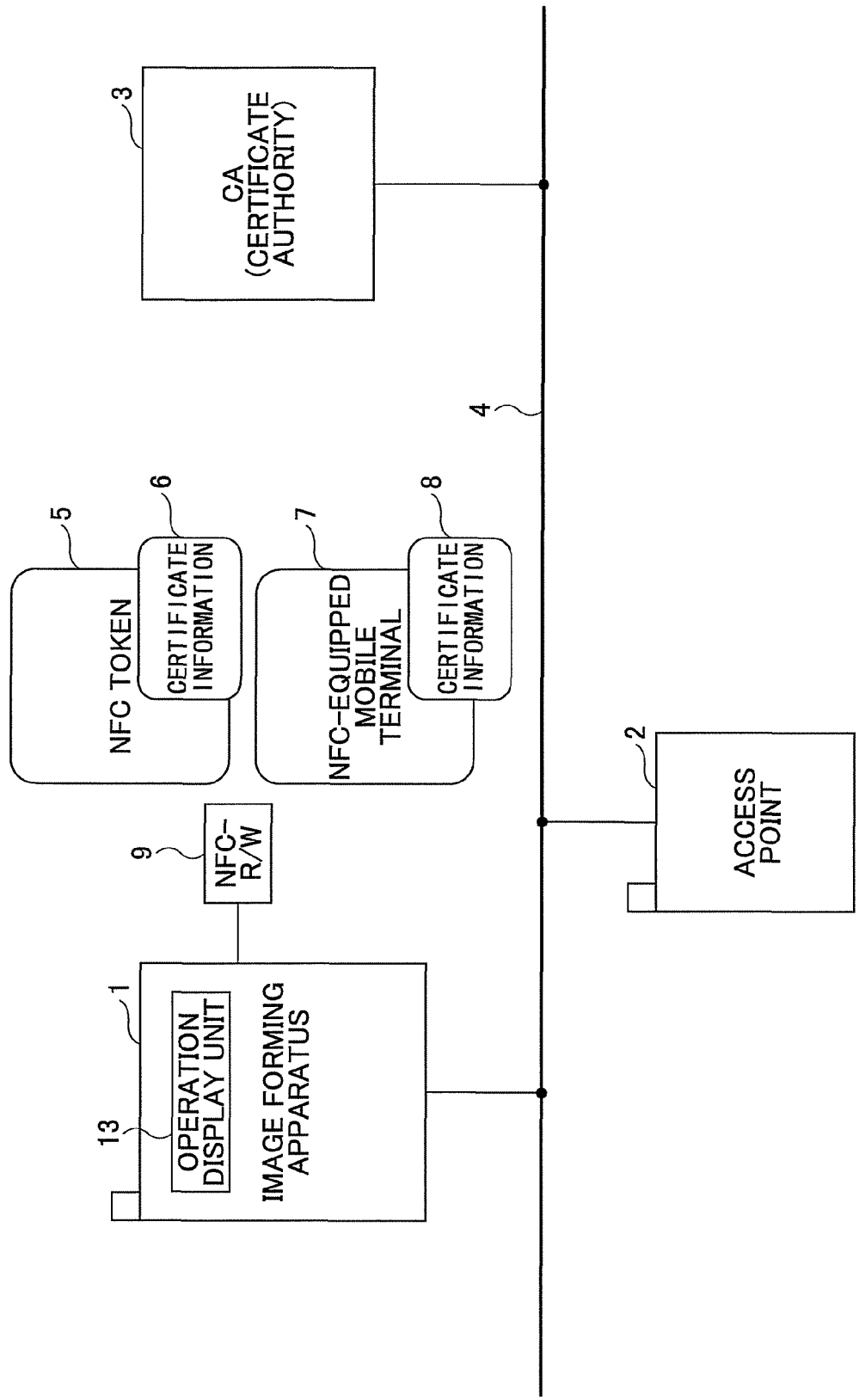
FIG. 1 is a block diagram illustrating the configuration of a network system inclusive of an image forming apparatus according to an embodiment.

FIG. 1 is a block diagram illustrating the configuration of a network system inclusive of an image forming apparatus according to an embodiment. The system illustrated in FIG. 1 includes an image forming apparatus 1, an access point 2, and a certificate authority (CA) 3, which are connected through a network 4 to communicate with each other. The image forming apparatus 1 is connected to an NFC reader/writer apparatus (hereinafter referred to as an NFC-R/W) 9 that provides an interface with an NFC token 5 or an NFC-equipped mobile terminal 7. The network 4 may be a wired LAN or wireless LAN, or may be a combination of these.

The NFC-R/W 9 connected to the image forming apparatus 1 may perform NFC communication with the NFC token 5 or the NFC-equipped mobile terminal 7 (such as an NFC-equipped mobile phone or PDA). Communication starts when the NFC token 5 or the NFC-equipped mobile terminal 7 enters the communication range of the NFC-R/W 9. A user carries the NFC token 5 or the NFC-equipped mobile terminal 7 which stores, within a token, association information required for network setting and certificate information 6 or 8 provided on a user-specific or token-specific basis. The NFC token 5 or the NFC-equipped mobile terminal 7 may be held over the NFC-R/W 9 upon starting to use the image forming apparatus 1, thereby performing network association, pairing, or authentication. Successful completion of any one of these authentication processes makes it possible to start communication with the image forming apparatus 1 and use of an installed application. In the case of certificate information being required for security purposes, the certificate information 6 or 8 embedded in the NFC token 5 or the NFC-equipped mobile terminal 7 may be used to perform encrypted communication or provide a signature for electronic data. The certificate information 6 or 8 may include as many certificates as can be stored within the capacity limit of the NFC token 5 or the NFC-equipped mobile terminal 7.

In FIG. 1, the image forming apparatus 1 is an example of a peripheral device. One or more other peripheral devices such as a printer, a scanner, a facsimile, a digital multifunctional device equipped with at least two functionalities of these devices, or a personal computer may be connected to the network in place of, or in addition to, the image forming apparatus 1.

Figure 2:
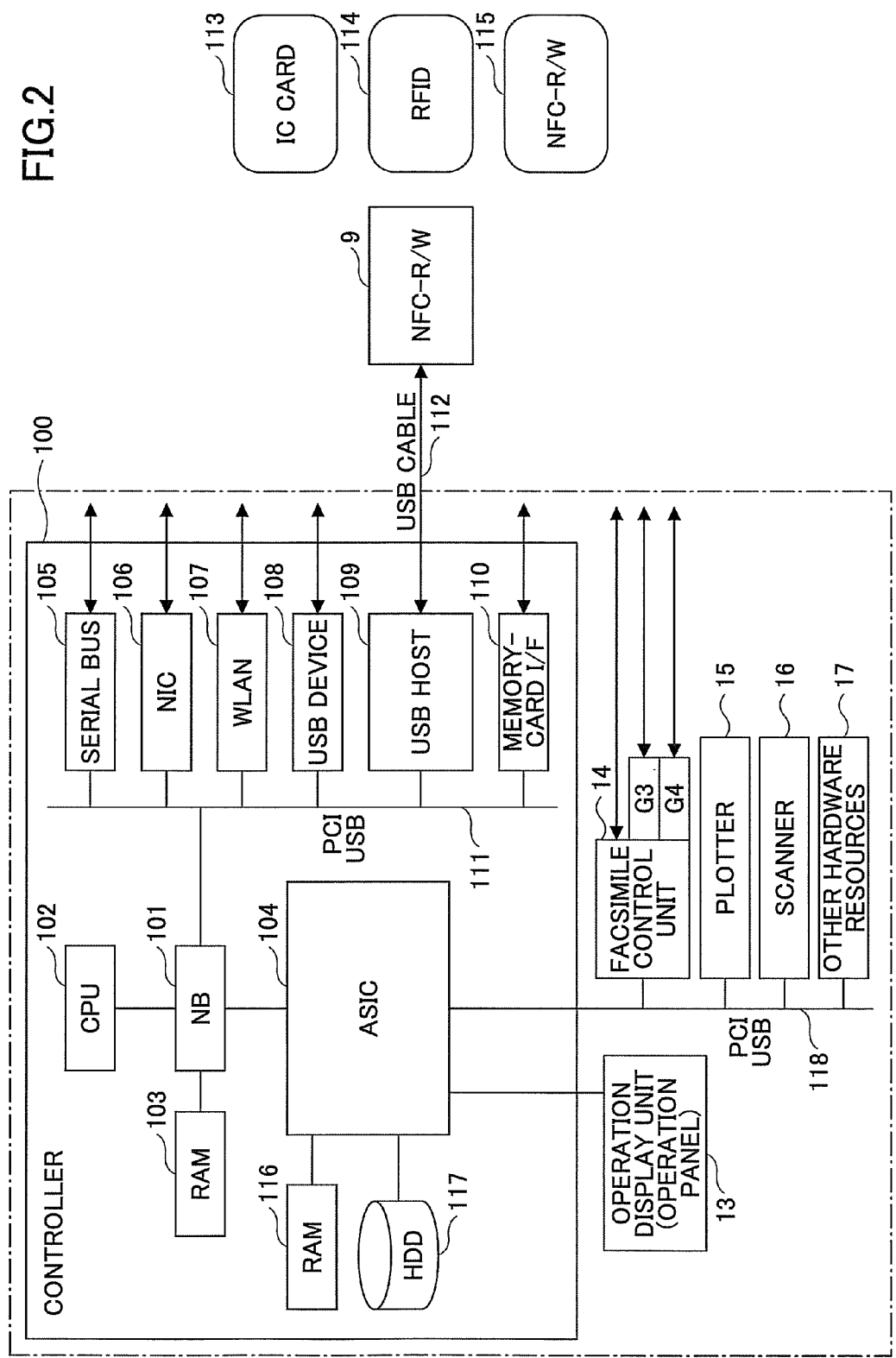
FIG. 2 is a block diagram illustrating the hardware configuration of the image forming apparatus illustrated in FIG. 1.

FIG. 2 is a block diagram illustrating the hardware configuration of the image forming apparatus illustrated in FIG. 1. The image forming apparatus 1 mainly includes a controller 100, an operation display unit 13, a facsimile control unit 14, a plotter (plotter engine) 15, a scanner (scanner engine) 16, and other hardware resources 17.

The controller 100 includes a north bridge (hereinafter referred to as an NB) 101, a CPU 102, a RAM 103, and an ASIC 104. The CPU 102, the RAM 103, and the ASIC 104 are connected to the NB 101. The NB 101 is further connected to a serial bus 105, an NIC (network interface card) 106, a wireless LAN (hereinafter referred to as a WLAN) 106, a USB device 108, a USB host 109, and a memory-card I/F 110 through a PCI bus 111. These are used to establish connection for serial communication, network communication, wireless communication, and USB devices. The USB host 109 is connected to the NFC-R/W 9 via a USB cable (bus) 112. The USB host 109 may use the NFC-R/W 9 to access an NFC token of an IC card 113, an RFID 114, another NFC-R/W 115, or the NFC-equipped mobile terminal 7 such as a mobile phone or PDA. The ASIC 104 is connected to a RAM 116 and an HDD 117. The NFC-equipped mobile terminal 7 such as a mobile phone or PDA is provided with an NFC chip set using a smart card chip, thereby being capable of performing NFC-protocol communication. In the present embodiment, communication with a device connected to the network 4 may be performed through the NFC-R/W 9.

Hardware such as the facsimile control unit 14, the air-conditioning units 15, the scanner 16, and the hardware resources 17 is connected to the ASIC 104 via a PCI bus 118. Further, the operation display unit (i.e., operation panel) 13 is directly connected to the ASIC 104 without the PCI bus 118 intervening therebetween.

In the controller 100, the CPU 102 controls various units connected thereto through the NB 101. The ASIC 104 performs predetermined control with respect to the above-noted hardware set. The CPU 102 loads programs stored in a ROM (not shown) or HDD 117 to the RAM 103. Using the RAM 103 as a work area, the CPU 102 performs control based on these programs. The RAM 116 is a memory device for temporarily storing data during the execution of control. The HDD 117 serves as a nonvolatile memory device that stores a vast amount of data.

The serial bus 105 serves to perform serial communication with an external device. The NIC 106 is an extension card for connection with a LAN. The WLAN 107 is an extension card for connection with a wireless LAN. These cards are used to provide LAN connection for the PCI bus 111. The USB device 108 is used for USB connection. A memory card is inserted into the memory-card I/F 110 according to need, and establishes connection with the PCI bus 111.

The operation display unit 13 is an operation panel, which provides a user interface that displays messages and receives operating inputs. The facsimile control unit 14 is used for facsimile communication according to the G3 standard and the G4 standard. The plotter 15 prints images on recording sheets. The plotter 15 serves as an output resource of the image forming apparatus 1. The scanner 16 is an optical scanner device for scanning a visible image such as a document or barcode. The scanner 16 serves as an input resource of the image forming apparatus 1 for reading data. The hardware resources 17 may include peripheral devices such as a sheet feeder apparatus, a finisher, a folding device, cover feeder, and a mail box.

In order to access the NFC token 5, the NFC-R/W 9 connected to the USB host 109 is used. The CPU 102 is connected to the NFC-R/W 9 via the north bridge 101, the PCI bus 111, the USB host 109, and the USB cable 112. The CPU 102 sends commands to the NFC-R/W 9 for control thereof. The NFC-R/W 9 then communicates with an NFC token of the IC card 113, the RFID 114, or the like. Network association information, pairing information, user authentication information, and key information for accessing authentication information are transmitted through a communication line connected to the USB host 109. This raises a concern that the information might be leaked by monitoring the USE cable 112. This is dealt with by encrypting transmitted data and commands on the USB path. Authentication is performed with the NFC-R/W 9 prior to encryption, and, then, a common key is generated based on the result of authentication. This common key is used for encryption and decryption thereby to provide a secure environment for the USE cable 112.

Figure 3:
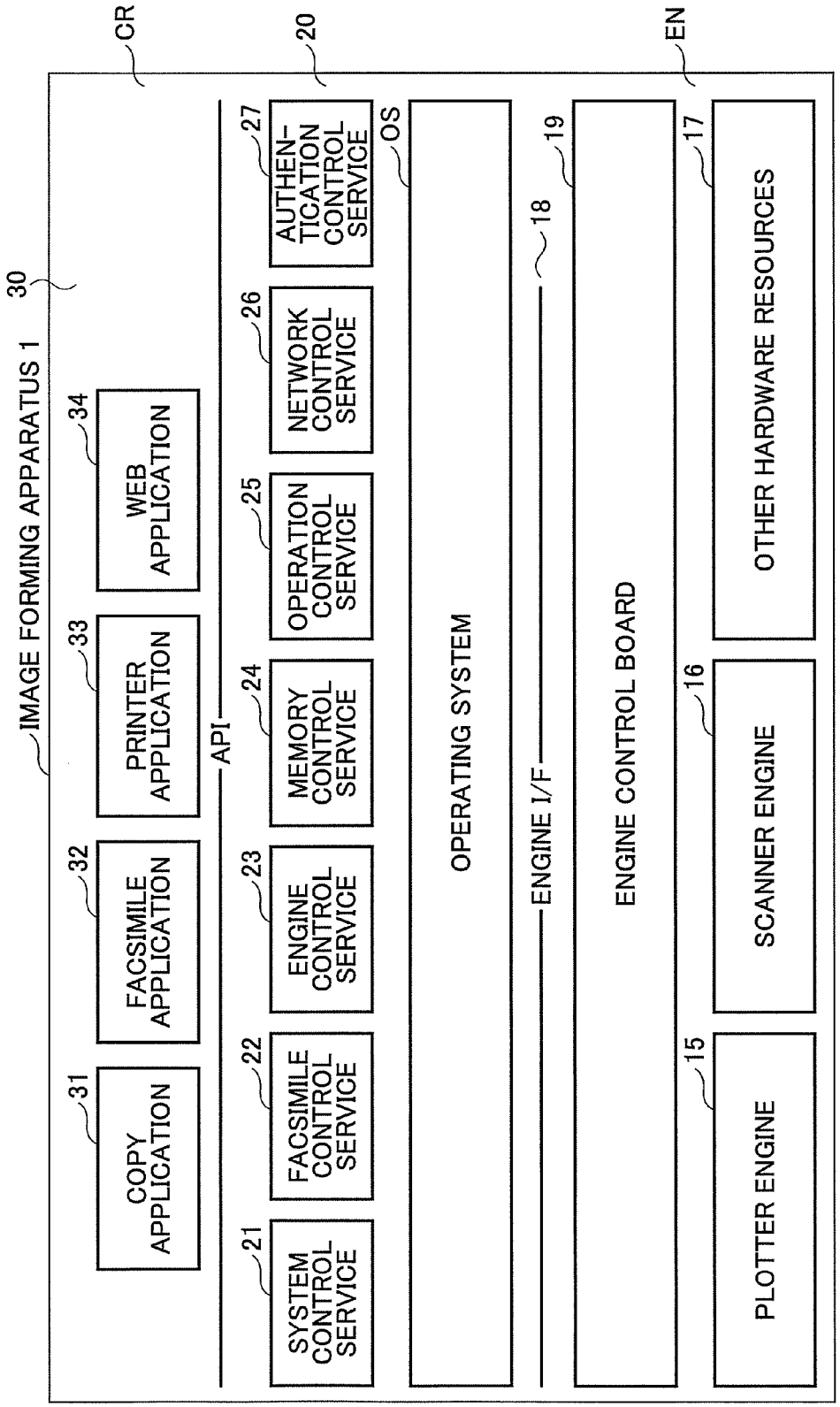
FIG. 3 is a block diagram illustrating the software configuration of the image forming apparatus according to the embodiment.

FIG. 3 is a block diagram illustrating the software configuration of the image forming apparatus 1 according to the present embodiment. The image forming apparatus 1 includes a controller unit CR and an engine unit EN. The engine unit EN performs physical operations such as printing, scanning, and the like under the control of the controller unit CR.

The controller unit CR is configured such that a service layer 20 and an application layer 30 are provided on an operating system OS. The service layer 20 includes a system control service 21, a facsimile control service 22, an engine control service 23, a memory control service 24, an operation control service 25, a network control service 26, and an authentication control service 27. The application layer 30 provided on the service layer 20 includes applications such as a copy application 31, a facsimile application 32, a printer application 33, a web application 34. In the engine unit EN, an engine control board 19 is connected to the controller unit CR through an engine I/F 18. The plotter engine 15, the scanner engine 16, and the hardware resources 17 are controlled through the engine control board 19.

With the configuration as described above, the image forming apparatus 1 performs copy, facsimile, printer, and web operations by use of the applications 31, 32, 33, and 34. The authentication control service 27 performs personal authentication in order to use these applications. The user can use the applications 31, 32, 33, and 34 only after the authentication control service 27 successfully completes network association, pairing, or private authentication.

Figure 4:
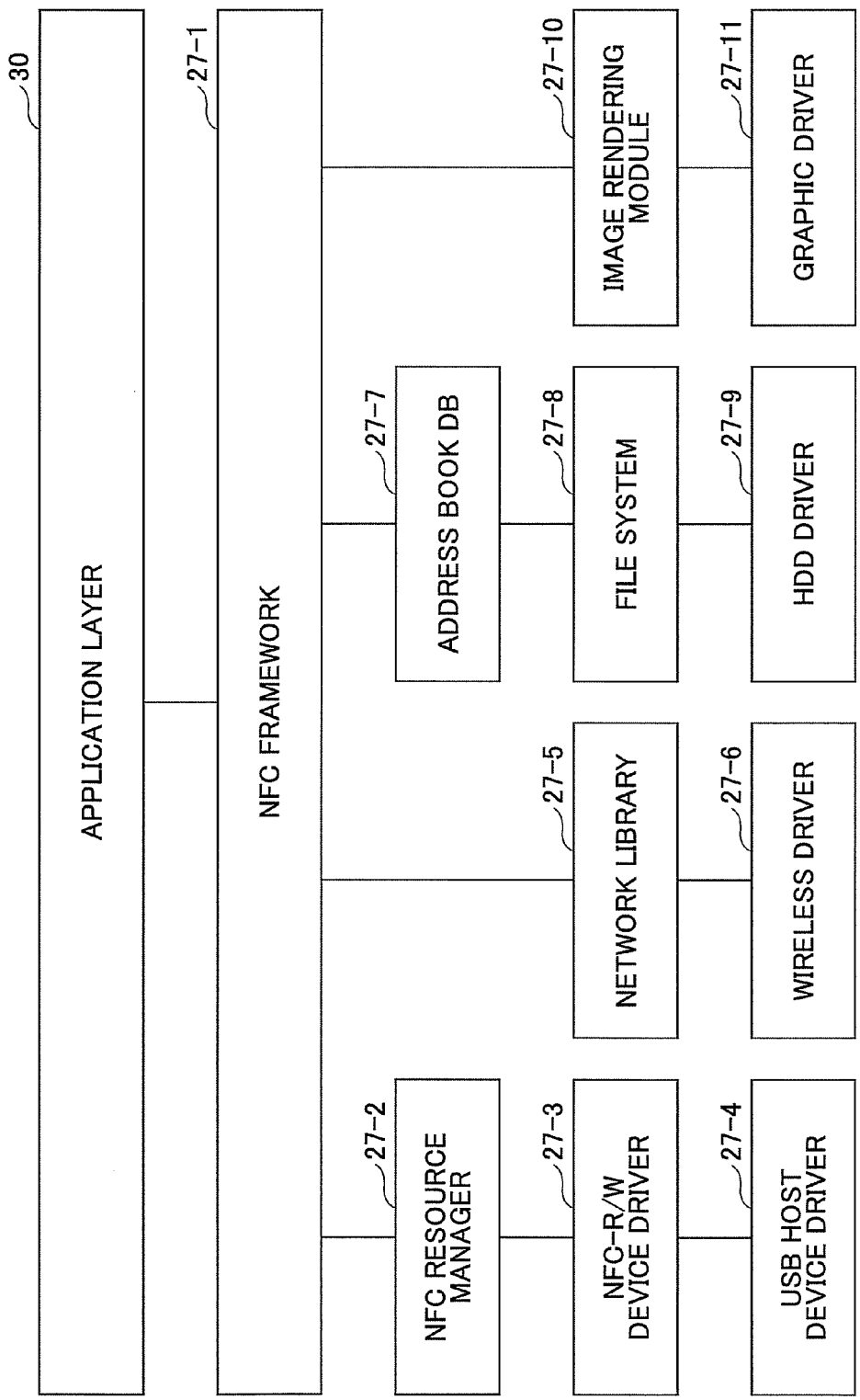
FIG. 4 is a block diagram illustrating the software module configuration of service modules of an authentication control service.

FIG. 4 is a block diagram illustrating the software module configuration of service modules of the authentication control service 27.

In FIG. 4, an NFC framework 27-1 of the service layer 20 is situated below the application layer 30. Under the NFC framework 27-1 are provided an NFC resource manager 27-2, a network library 27-5, an address book DB 27-7, and an image rendering module 27-10. Further, a NFC-R/W device driver 27-3 and a USB host device driver 27-4 are situated under the NFC resource manager 27-2. A wireless driver 27-6 is situated under the network library 27-5. A file system 27-8 and an HDD driver 27-9 are situated under the address book DB 27-7. A graphic driver 27-11 is situated under the image rendering module 27-10. The application layer 30 executes the applications 31, 32, 33, and 34 by using the NFC framework 27-1 as a basis.

In the present embodiment, the NFC framework 27-1 receives an authentication request from the application layer 30, and performs a displaying process with respect to the operation display unit 13 via the image rendering module 27-10 and the graphic driver 27-11. The NFC framework 27-1 acquires network setting information and authentication information from an NFC token by use of the NFC resource manager 27-2, and then uses the network library 27-5 to send an inquiry about the acquired information to the wireless driver 27-6 and/or the external access point 2. Alternatively, the NFC framework 27-1 sends the inquiry to the address book DB 27-7 or to an external authentication server. Information about details regarding the ongoing NFC frame inquiry and the results of the inquiry are sent to the application layer 30, together with data indicative of the success or failure of the network setting and authentication.

Figure 5:
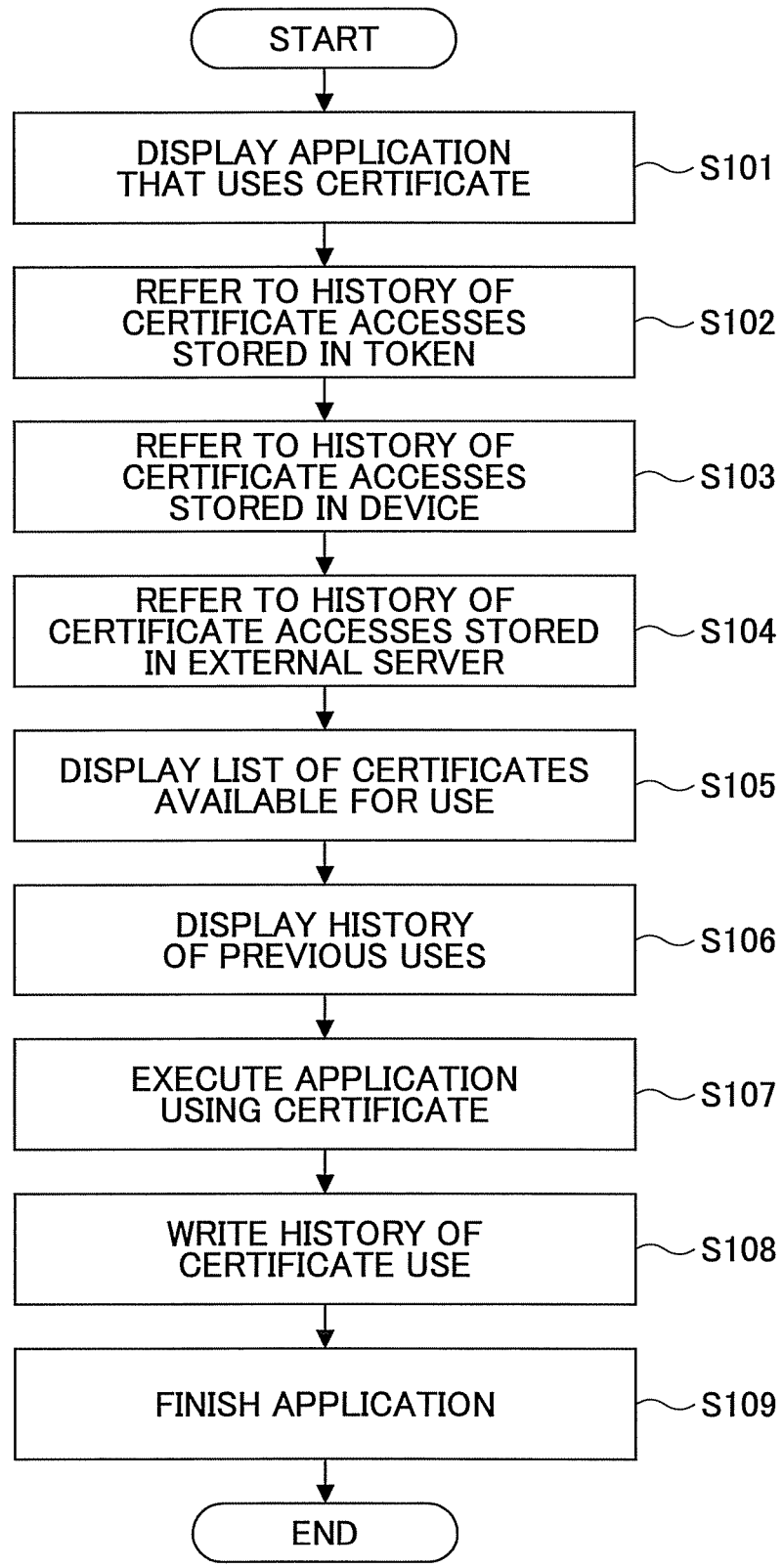
FIG. 5 is a flowchart illustrating a procedure of executing an application by using a certificate at the authentication control service with respect to an NFC token.

FIG. 5 is a flowchart illustrating a procedure of executing an application by using a certificate at the authentication control service 27 with respect to the NFC token 5 or a token of the NFC-equipped mobile terminal 7 illustrated in FIG. 1.

As was described in connection with FIG. 1, the NFC token 5 or the NFC-equipped mobile terminal 7 stores the certificate information 6 or 8, respectively. In the case of using an application relying on a certificate, an application screen for using a certificate is displayed (step S101). Then, the history of certificate accesses in the NFC token 5 or the token of the NFC-equipped mobile terminal 7, the history of certificate accesses in the wireless-function-equipped device (i.e., image forming apparatus) 1, and the history of certificate accesses in the external server are referred to (steps S102, S103, and S104). A list of available certificates are then displayed (step S105). Further, the history of previous uses is displayed (step S106). An application using a certificate is executed (step S107). Thereafter, the history of certificate use regarding this application is added to the history of previous uses (S108). The application then comes to an end (step s109)

In this procedure, the use of a certificate is recorded in the history upon using the NFC token 5 or the NFC-equipped mobile terminal 7 by utilizing the certificate information 6 or 8. This ensures that the history of uses is complete without any missing record. All the previous uses will thus be referred to the next time a certificate is used. In the present embodiment, the history of certificate uses is stored in the RAM 116 or the HDD 117, for example.

Figure 6:
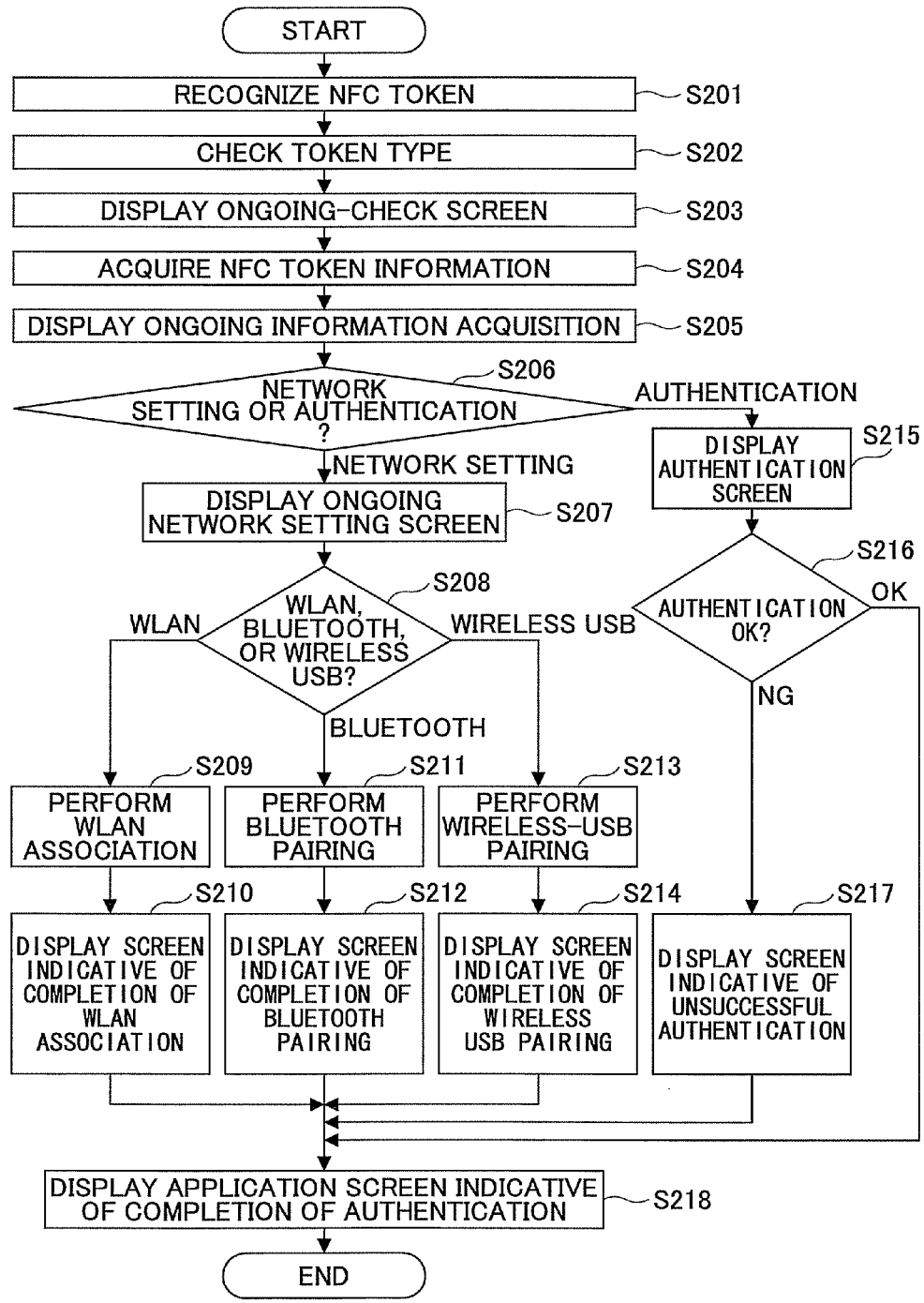
FIG. 6 is a flowchart illustrating the basic operation procedure of an authentication process using NFC according to the embodiment.

FIG. 6 is a flowchart illustrating the basic operation procedure of an authentication process using NFC according to the present embodiment. The procedure of the flowchart starts with a process in which the NFC framework 27-1 of FIG. 4 starts receiving, from the application layer 30, an authentication request or a pairing or association request to pair with a device. The procedure also involves outputting information about details regarding an ongoing inquiry and the results of the inquiry as well as data indicative of the success or failure of network setting and authentication.

In this flowchart, a system inclusive of the image forming apparatus 1 is activated first. After the activation, the NFC-R/W 9 that is connected to the USB host 109 of the image forming apparatus 1 may be available for use. A user brings the IC card 113, the RFID 114, the NFC token 5, or the NFC-equipped mobile terminal 7 such as a mobile phone or PDA to a close proximity (i.e., communication range) of the NFC-R/W 9 for waving over the NFC-R/W 9. Information within the token of any above-noted NFC-token-equipped device is checked (steps S201). Based on the access area information within the NFC token 5, information about the type of the NFC token 5 is checked (step S202). The information about the type of the NFC token 5 may indicate any one of the FeliCa, TypeA, TypeB standards, for example. In the present embodiment, PtoP (Peer to Peer) may also be recognized. Further, the RFID 114 is also usable as was previously noted.

Figure 7:
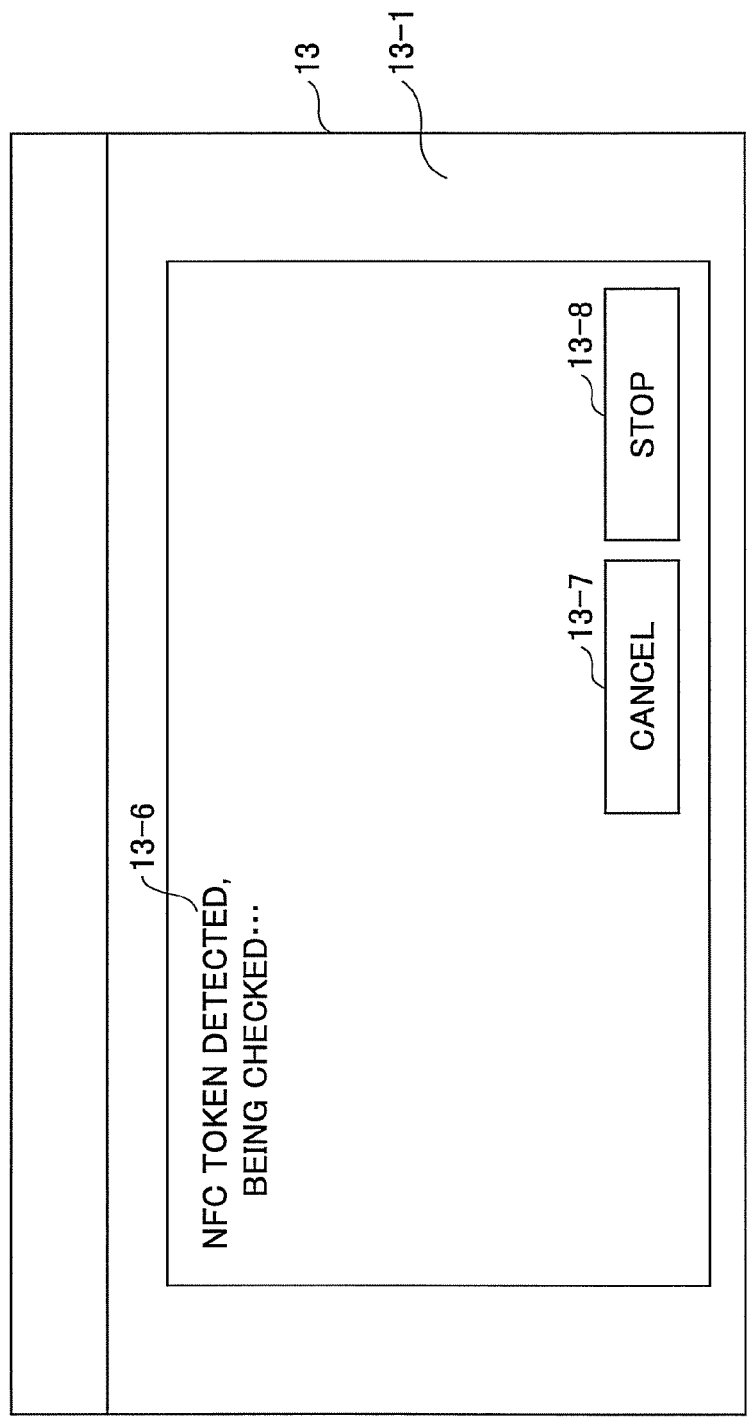
FIG. 7 is a drawing illustrating the displayed contents of an operation display unit of the image forming apparatus with respect to an example in which a message indicative of an ongoing check of an NFC device is displayed.

An ongoing-check indicating screen illustrated in FIG. 7 is presented to the user (S203) while the process of checking the NFC token in step S201 and the processing of checking the type of the NFC token in step S202 are being performed. A check is made (step S204) as to whether the information stored in the NFC token 5 is for network association, pairing, or authentication. Thereafter, information regarding the acquisition and restriction of information is, extracted (step S205). A check is then made (step S206) as to whether to make a network setting or to perform authentication.

A display screen 13-1 indicative of an ongoing check process illustrated in FIG. 7 shows a message 13-6 indicating "NFC TOKEN DETECTED, BEING CHECKED . . . ", a cancel button 13-7, and a stop button 13-8. The cancel button 13-7 is pressed when the user notices that the NFC token 5 being checked is a wrong token, thereby to use a correct NFC token 5. A correct NFC token 5 may be held over the NFC-R/W 9 after the pressing of this button, thereby causing the apparatus to check the correct NFC token 5 without interrupting the check process. The stop button 13-8, on the other hand, is pressed to terminate the check process when the user did not intend to check the NFC token 5.

In response to detection by the check in step S206 that a network setting is to be made, the display screen 13-1 indicates that network settings are being made. Network association or pairing is then performed by using information necessary for network settings obtained from the NFC token 5 (step S208, S209, S211, and S213). After the completion of the network association or pairing process, an indication of the completion is shown to the user on the display screen 13-1 of the operation display unit 13 (step S210, S212, S214). With this, the procedure comes to an end.

Figure 8:
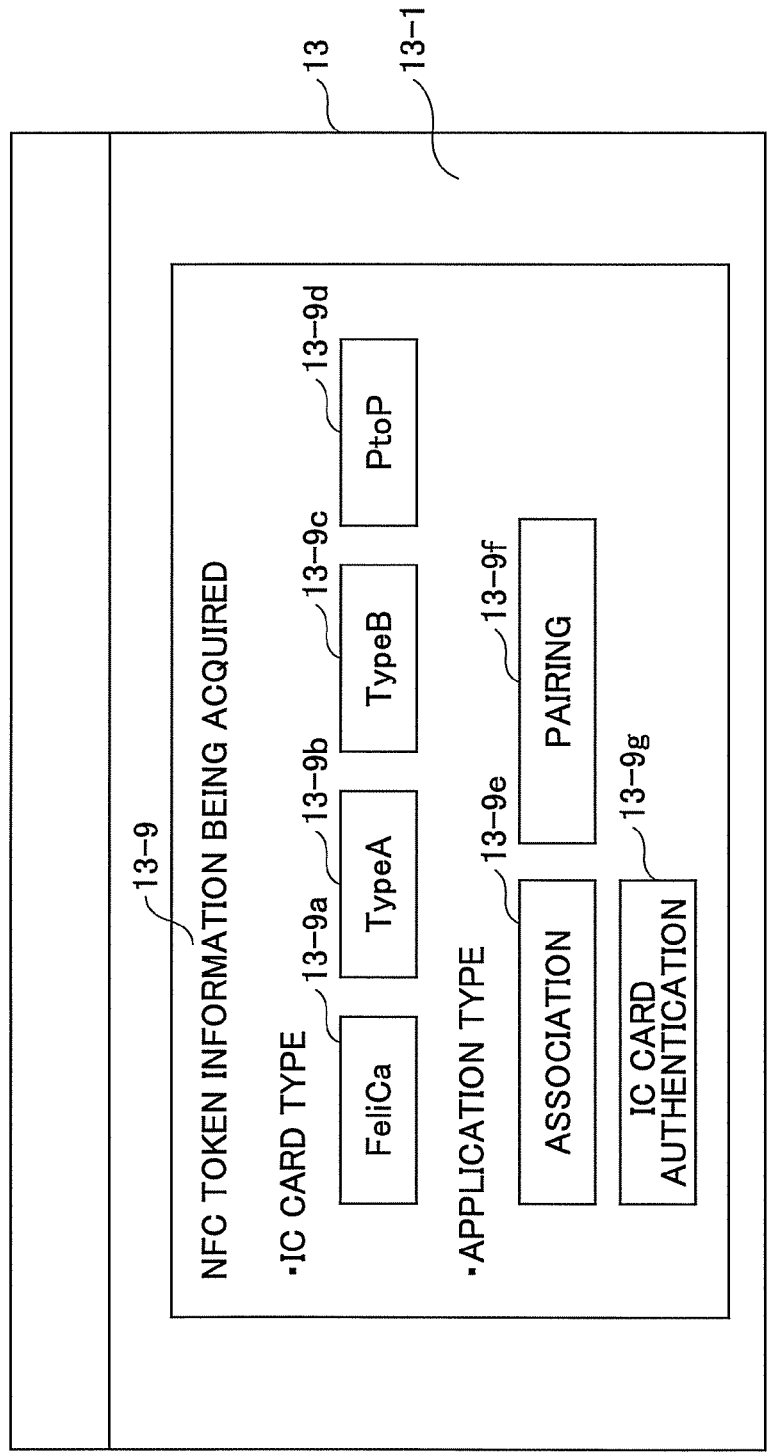
FIG. 8 is a drawing illustrating the displayed contents of an operation display unit of the image forming apparatus with respect to an example in which a message indicative of an ongoing acquisition of NFC device information is displayed.

FIG. 8 is a drawing illustrating contents displayed on the screen of the operation display unit 13 when the NFC token information is being acquired after the completion of a check illustrated in FIG. 7. In this example, information stored within the NFC token 5 is displayed. Namely, the standard used by the NFC token 5 (i.e., the card type of the IC card) is checked based on the information stored in the NFC token 5, thereby displaying what the type of the checked NFC token 5 is. Further, an indication of the purpose for which the information is acquired is displayed on the screen based on the information stored in the NFC token 5 and the area that is accessed. The card type of the NFC token 5 used in the present embodiment may be any one of the FeliCa, TypeA, TypeB standards, for example. In the present embodiment, PtoP (Peer to Peer) may also be recognized.

In the present embodiment, the message "NFC TOKEN INFORMATION BEING ACQUIRED" is displayed. Relevant ones of the displayed items are highlighted in a reversed display to indicate the identified card type that is one of a FeLiCa standard 13-9*a*, a TypeA standard 13-9*b*, a TypeB standard 13-9*c*, and a PtoP (Peer to Peer) 13-9*d*, and also to indicate the association type to be used for authentication that is one of an association 13-9*e*, a pairing 13-9*f*, and an IC-card authentication 13-9*g*. With this arrangement, the user can easily obtain full knowledge of the information stored in the NFC token 5 at a glance.

In response to detection by the check in step S206 that authentication is to be performed, the procedure proceeds to step S215. In the authentication process, an authentication screen is displayed (step S215). Upon successful authentication (Yes in step S216), an application screen for which authentication is completed is displayed (step S218). Upon unsuccessful authentication, an indication of the unsuccessful authentication is displayed (step S217). Thereafter, an application screen for which authentication is completed is displayed (step S218). With this, the procedure comes to an end.

Figure 9:
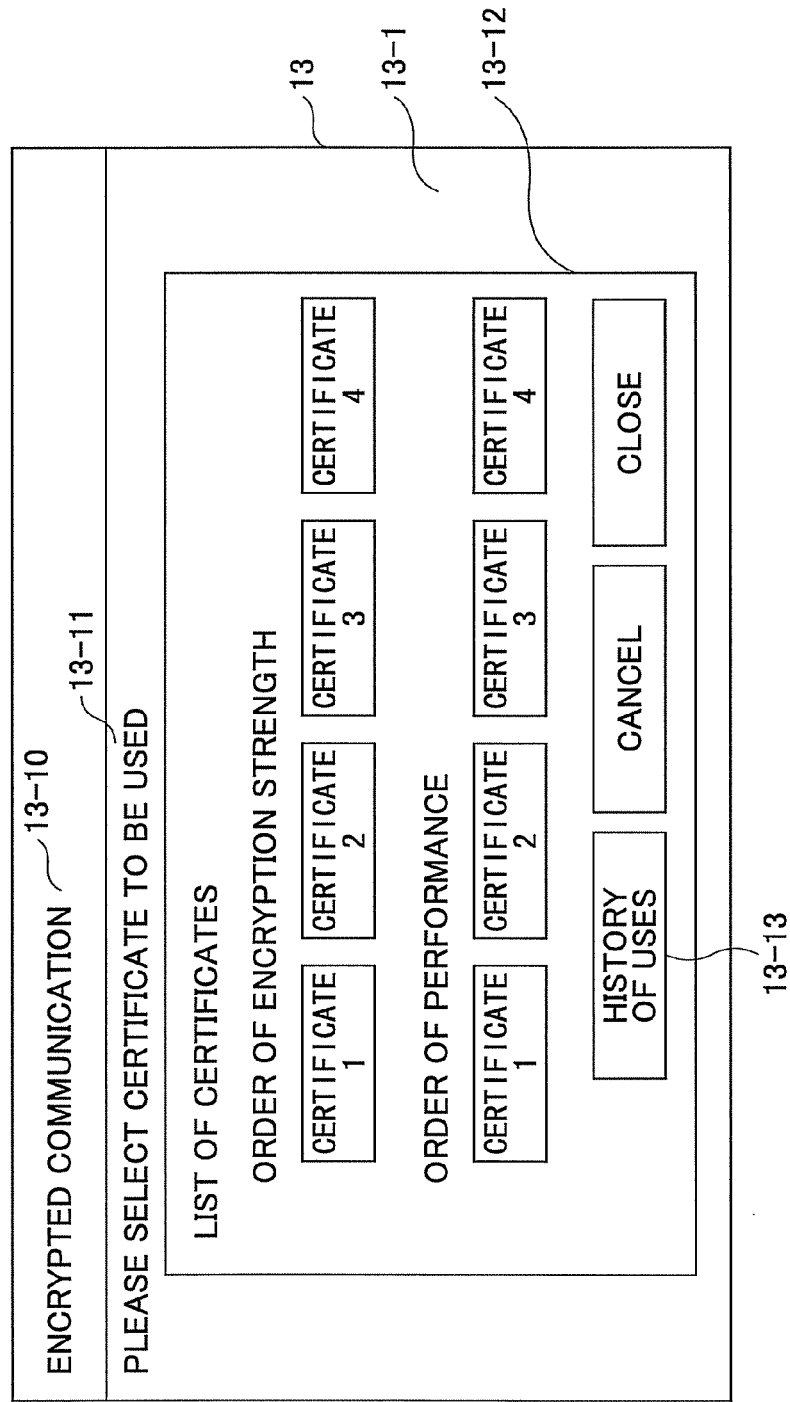
FIG. 9 is a drawing illustrating the displayed contents of an operation display unit of the image forming apparatus with respect to an example in which a certificate selection screen is displayed for encrypted communication.

FIG. 9 is a drawing illustrating an example of a certificate selecting screen used for encrypted communication. This screen is displayed when a function provided in the image forming apparatus 1 executes an application that needs to use encrypted communication. A user holds the NFC token 5 storing plural certificate data over the NFC-R/W 9 after selecting the above-noted application. In response, an encrypted communication screen 13-10 and a certificate selecting screen 13-11 are displayed. The former screen shows the message "ENCRYPTED COMMUNICATION", the latter screen shows the message "PLEASE SELECT CERTIFICATE TO BE USED". The certificate selecting screen 13-11 includes a certificate list screen 13-12 and a history-of-uses button 13-13 for obtaining a history of certificate uses by the user.

The history information is obtained (i.e., above-noted step S204) when any application process is performed to access the NFC token 5 for user authentication, pairing, or association that uses the NFC token 5. After the application process using a certificate is completed by use of the NFC token 5, the history information is stored in the NFC token 5, or is linked to the user or to the NFC token 5 to be stored in the image forming apparatus 1 or in the external server (step S108). Storing the history information in the NFC token 5 has a merit in that it is not dependent on the image forming apparatus 1 being used. A certificate to be used may be selected by taking into account the encryption strength and processing performance (i.e., processing speed) of the registered certificates. When displaying a list of certificates, the certificate list screen 13-12 illustrated in FIG. 9 arranges CERTIFICATE1 through CERTIFICATE4 in the order of encryption strength, and also arranges CERTIFICATE1 through CERTIFICATE4 in the order of processing speed. The user can select a certificate from these lists. In this manner, certificates to be used can be tied to encryption strength and performance. The order of performance is used in this example. Another criterion may be used to determine a priority order, so that the certificates are tied to encryption strength and to the priority order.

Figure 10:
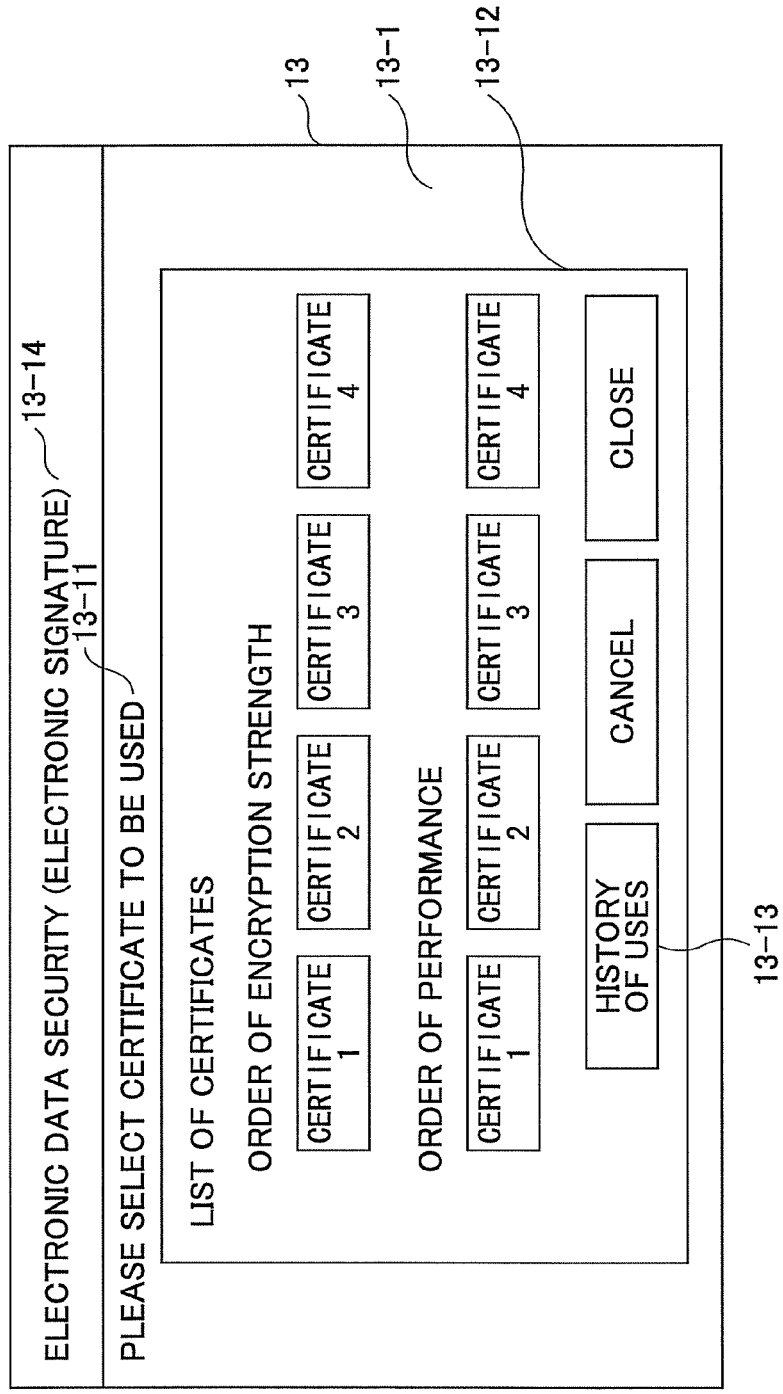
FIG. 10 is a drawing illustrating the displayed contents of an operation display unit of the image forming apparatus with respect to an example in which a certificate selection screen is displayed for electronic data security.

FIG. 10 is a drawing illustrating an example of a certificate selecting screen used for electronic data security. This screen is displayed on the operation display unit 13 when a function provided in the image forming apparatus 1 executes an application that needs to provide security (e.g., add an electronic signature) to electronic data. FIG. 10 differs from FIG. 10 only in that an electronic data security (electronic signature) 13-13 is displayed in place of the encrypted communication 13-10. The remaining displayed items are the same. The actual contents (i.e. CERTIFICATE1 through CERTIFICATE4) of the certificates displayed on the operation display unit 13 are the same as those of FIG. 9. Namely, the same certificates (i.e., CERTIFICATE1 through CERTIFICATE4) can be used in both the encrypted communication and the electronic data security (electronic signature).

Similarly to the previous example, a user holds the NFC token 5 storing plural certificate data over the NFC-R/W 9 after selecting the above-noted application, thereby causing this screen to be displayed. The history of certificate uses made by the user can be checked by touching the history-ofuses button 13-13. The history information may be stored in the NFC token 5 as in the case of encrypted communication, and, thus, may not be dependent on the image forming apparatus 1 being used. Further, certificate to be used may be selected by taking into account the encryption strength and processing performance (i.e., processing speed) of the registered certificate information 6 or 8.

FIG. 9 and FIG. 10 are examples only. Similar servers may be provided to the functions and applications of an image forming apparatus that need a certificate.

Figure 11:
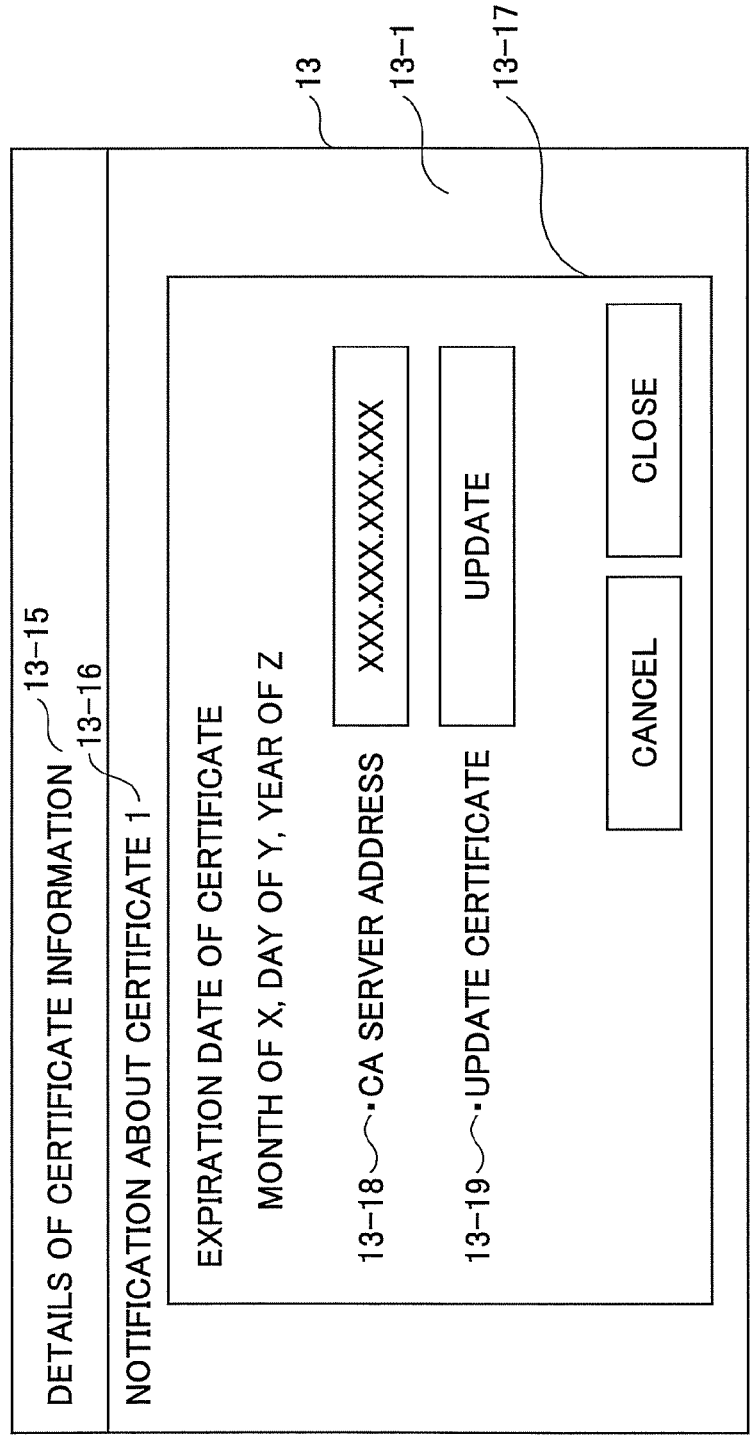
FIG. 11 is a drawing illustrating the displayed contents of an operation display unit of the image forming apparatus with respect to an example in which an alert indicative of details of a certificate is displayed.

FIG. 11 is a drawing illustrating an example of a detailed-warning display regarding certificate information. In FIG. 11, a notice is displayed to inform a user that the expiration date of a certificate is approaching when a function provided in the image forming apparatus 1 performs an application that needs the certificate.

In this example, the operation display unit 13 includes a title 13-15 indicating "DETAILS OF CERTIFICATE INFORMATION" and the display screen 13-1. The display screen 13-1 indicates "NOTIFICATION ABOUT CERTIFICATE1". Further, a message regarding the expiration date is displayed in a message display screen 13-17. The displayed message includes an indication of the expiration date of the certificate, a server address 13-18 of the certificate authority 3, and a button 13-19 for renewing the certificate. Further, a "cancel" button and a "close" button are also displayed.

With this display screen, information about the address of the CA server 3 is displayed when the expiration date of the certificate is approaching, thereby requesting to make a choice of whether to renew the certificate. When the user chooses to renew the certificate, a renewed certificate is stored in the NFC token.

Figure 12:
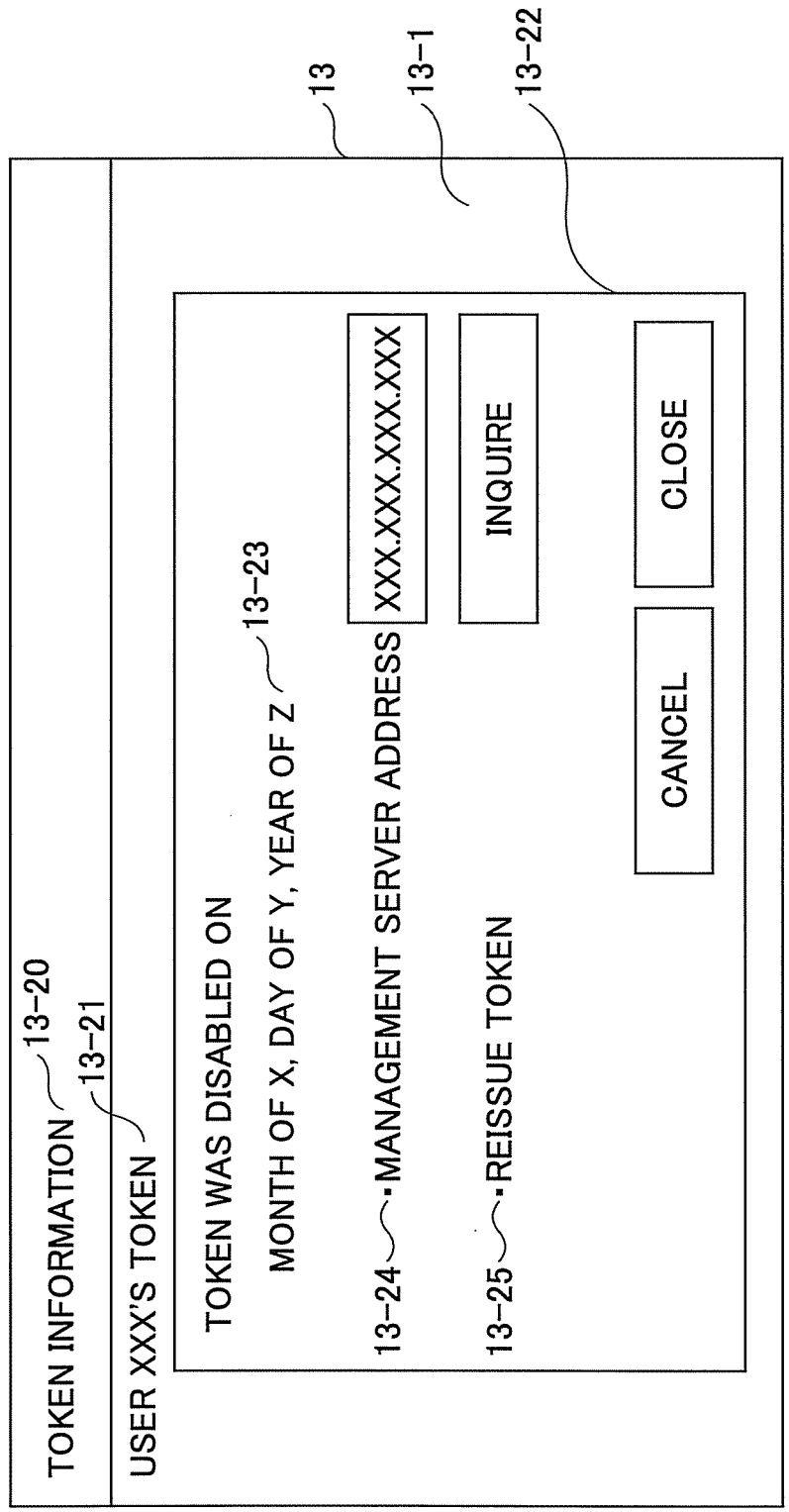
FIG. 12 is a drawing illustrating the displayed contents of an operation display unit of the image forming apparatus with respect to an example in which a token being used has already been disabled.

FIG. 12 is a drawing illustrating an example of a display screen when the token being used has been disabled. In this example, the operation display unit 13 includes a title 13-20 indicating "TOKEN INFORMATION" and the display screen 13-1. The display screen 13-1 displays "USER XXX'S TOKEN" 13-21, and a message regarding the disabling is displayed in a message display screen 13-22. The displayed message includes an indication 13-23 of the year, month, and day on which the token was disabled, a management server address 13-24, and an inquiry field 13-25 for inquiring about the reissue of the token.

When the user who owns the NFC token 5 loses the NFC token 5, the fact of the loss of the NFC token 5 is recorded in the NFC token 5 by information controlled by the CA server 3 or the device (i.e., image forming apparatus 1) that manages token information. Alternatively, the fact of the loss of the NFC token 5 is reported to the CA server 3 or to the image forming apparatus 1. With this arrangement, the fact that the NFC token 5 has been disabled is displayed on the operation display unit 13 when the NFC token 5 is used. Information about the loss is not only stored in the external server (i.e., CA server 3) or the relevant device (i.e., the image forming apparatus 1), but also stored in the card (i.e., NFC token 5).

The fact that the NFC token is lost may include a case in which the user dropped the NFC token 5, and did not know it, and may also include a case in which the user placed the NFC token somewhere, and does not remember where it was. In either case, there is a need to prevent others from using the lost NFC token. A measure is thus taken to prevent the NFC token 5 from being freely used when it is picked up. To this end, an alert is sent to the user when the NFC token 5 has not been used for a certain time period, and requires authentication to be performed based on user-specific information. This process is performed both in the case where the user himself/herself finds the lost NFC token 5 and in the case where someone else finds it.

The NFC token 5 may be found after a new NFC token 5 is reissued. When this happens, the old NFC token 5 is disabled in most cases. Even if the user attempts to use the old NFC token 5, the old NFC token 5 cannot be used because it is not linked to the user any longer. In this manner, a preventive measure is taken to disable the lost NFC token 5 to make it unusable when the token is lost and reissued. The NFC token 5 may be found after a long time. In this case, a check is made as to whether the user is a legitimate user. Upon successful authentication that proves the legitimate user status, the NFC token 5 may be enabled and used again.

Figure 13:
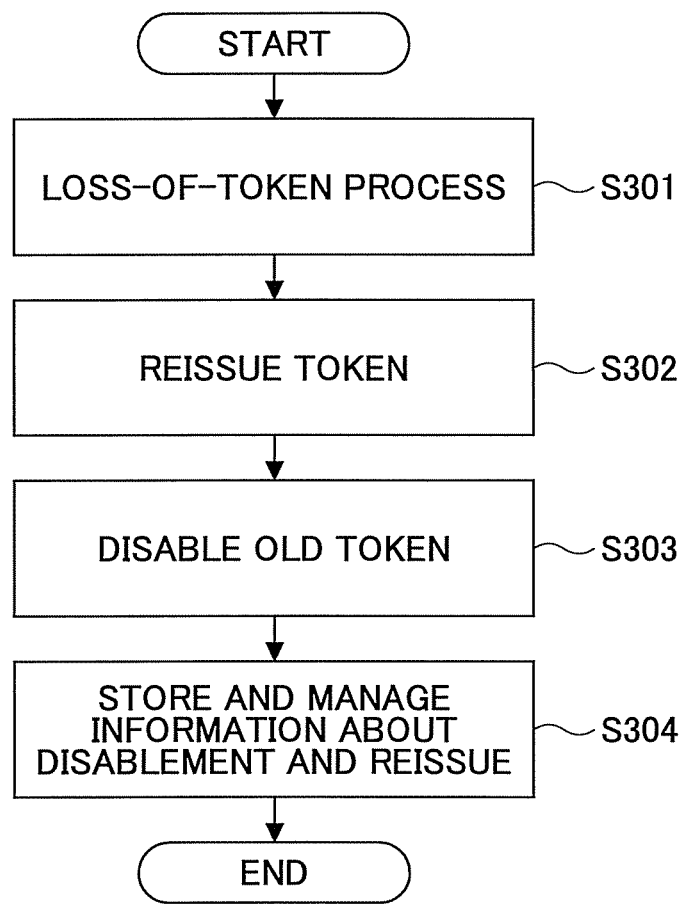
FIG. 13 is a flowchart illustrating the process of disabling a lost token.

FIG. 13 is a flowchart illustrating the process of disabling a lost token. In FIG. 13, a loss process is performed for the NFC token 5 (step S301). When a new NFC token 5 is reissued (step S302), the old NFC token 5 is disabled (S303). Information about the disabling process (step S303) and the reissue process (step S302) are stored in the external server (i.e., CA server 3) or in the relevant device (i.e., the image forming apparatus 1) for subsequent management (step S304).

Figure 14:
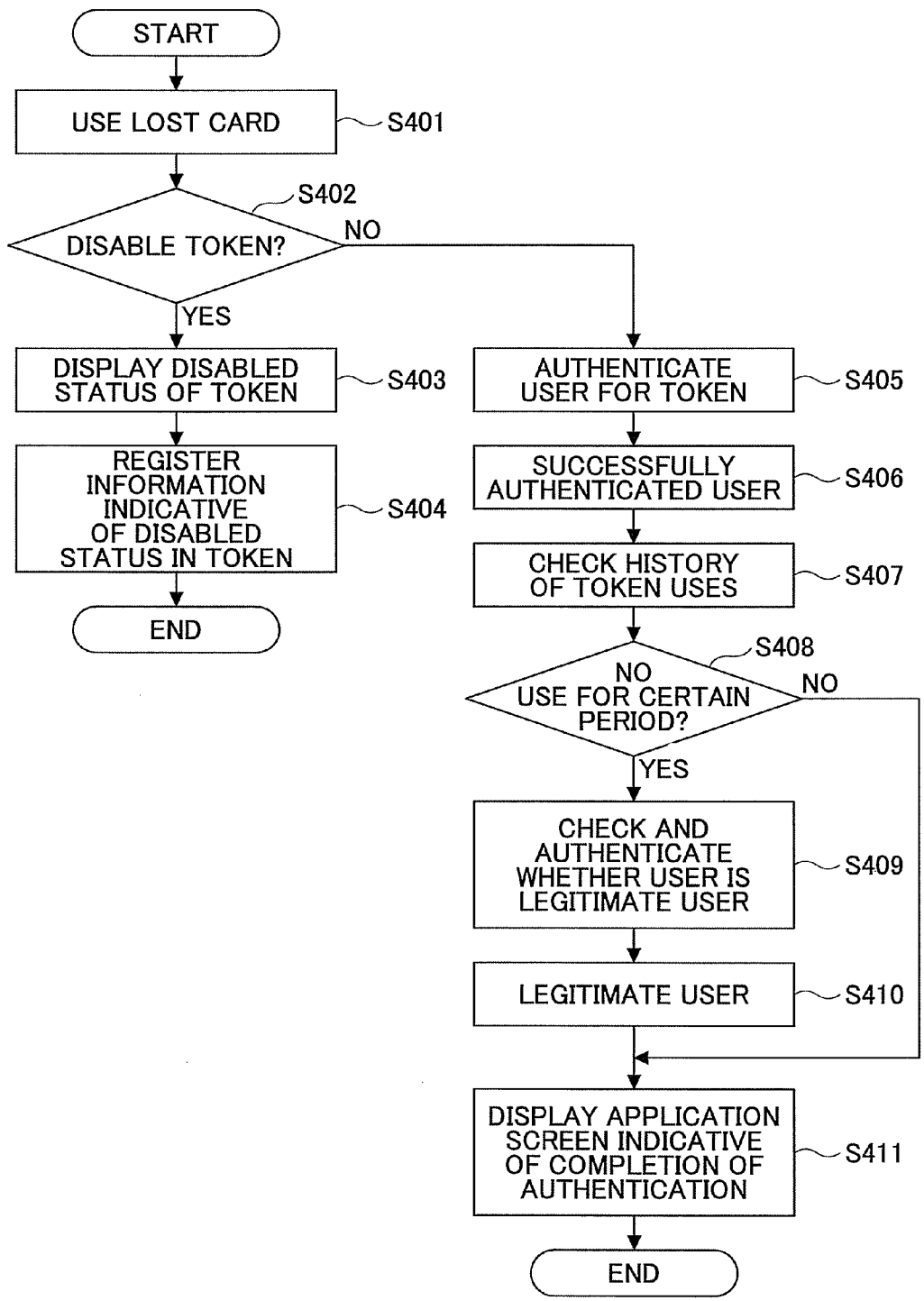
FIG. 14 is a drawing illustrating a procedure that is performed when a lost NFC token is used.

FIG. 14 is a drawing illustrating a procedure that is performed when a lost NFC token is used. In this procedure, the lost card is used (step S401). In response, a check is made as to whether to perform a token disabling process (S402). Upon determining that the token disabling process is to be performed, a message indicative of a lost token as illustrated in FIG. 12 is displayed on the display screen of the operation display unit 13 of the image forming apparatus 1 (step S403). Information indicating the disabled status of the card is registered in the NFC token 5 (steps S404).

Upon determining in step S402 that the token disabling process is not to be performed, user authentication is performed with respect to the NFC token 5 (step S405). The user authentication succeeds with respect to the user (step S406). With respect to the user for whom the authentication is successful, then, the history of token uses is checked (step S407). Based on the history, a check is made as to whether there is no record of use for a predetermined period of time (step S408). If there is no record of use for a predetermined period of time, a check is further made as to whether the user successfully authenticated in step S206 is a legitimate user (step S409). Further, the user is authenticated again as a legitimate user (step S410). A message indicative of the completion of authentication is displayed on the display screen 13-1 (step S411). With this, the procedure comes to an end. If it is ascertained in step S408 that there is a record of use made during the predetermined period of time, the procedures directly proceeds to step S411 based on the determination that the user successfully authenticated in step S406 is a legitimate user. A message indicative of the completion of authentication to this effect is displayed (step S411). With this, the procedure comes to an end.

In this manner, when a disabling process is performed, the NFC token 5 becomes unavailable for use in the subsequent processes (i.e., step S404 and thereafter). In the case of no disabling process being performed, user authentication is performed upon determining that there is no record of use for a predetermined time period. If the token is used during the predetermined time period, the NFC token 5 continues to be usable.

As described above, the present embodiment provides the following advantages.

1) Upon successful authentication of the user using the NFC token, this user is determined to be a legitimate user. 2) Based on the determination that this user is a legitimate user, information about a user-specific certificate stored in the NFC token or in a memory device is used. Further, the encryption of a communication path or the provision of security to electronic data is enabled for network communication initiated by the device.

2) A certificate installed in the memory device inclusive of the NFC token is used. Even if there is a case of misuse by a malicious user, a wide-range security hole is prevented since such a misuse is limited to the users who use NFC tokens.

3) Authentication of a user using an NFC token is required. This improves network security and data security on a user-specific basis for a user who uses an image forming apparatus (i.e., device).

4) Without a need to have a certificate installed in an image forming apparatus, a user-specific certificate installed in the memory device inclusive of the NFC token is used.

5) Information about a plurality of certificates may be stored in an NFC token. This makes it possible to select a certificate based on encryption strength, for example, while this certificate might be not preferable under another criterion.

6) User authentication links an NFC token to a user using the NFC token. This prevents a person other than the user from tampering with the NFC token for the purpose of using the NFC token.

7) Certificate information is registered in an NFC token, so that there is a no need to register certificate information on a device-specific basis or on a function-specific basis with respect to a device such as an image forming apparatus connected to a network. This reduces the occupied storage space in a RAM disc or HDD of the device.

According to one embodiment, a program for controlling communication processing is provided. The program causes a computer to perform communication processing control of a peripheral device which includes an interface for connection to a wired or wireless LAN and a local interface for wireless connection. The program includes checking a legitimacy of a user based on a user-specific certificate stored in a communication-function-equipped device upon being accessed through the local interface by the communication-function-equipped device using near-field wireless communication, and also includes allowing a predetermined process to be performed upon successful authentication of the legitimacy of the user.

Further, the present invention is not limited to these embodiments, but various variations and modifications may be made without departing from the scope of the present invention.

The present application is based on Japanese priority application No. 2010-015756 filed on Jan. 27, 2010, with the Japanese Patent Office, the entire contents of which are hereby incorporated by reference.

What is claimed is:

1. A peripheral device, comprising:
an interface for connection to a wired or wireless LAN;
a local interface for wireless connection; and
a central processing unit configured to check a legitimacy of a user based on a user-specific certificate stored in a communication-function-equipped device upon being accessed through the local interface by the communication-function-equipped device using near-field wireless communication, and to allow a predetermined process to be performed upon successful authentication of the legitimacy, wherein the central processing unit is configured to allow the user to decide whether a process of disabling a lost user-specific certificate is performed when the lost user-specific certificate is used, wherein, when the process of disabling the lost user-specific certificate is performed, the peripheral device displays a notification for a disabled user-specific certificate on an operation display unit of the peripheral device, and registers a disabled status in the user-specific certificate, wherein, when the process of disabling the lost user-specific certificate is not performed, the authentication of the legitimacy is performed by the lost user-specific certificate, and a history of use of the lost user-specific certificate is checked upon establishing a successful authentication, wherein the central processing unit is further configured to determine whether the lost user-specific certificate is used in a predetermined period of time based on the history of the use of the lost user-specific certificate, wherein if the lost user-specific certificate is not used in the predetermined period of time it is determined whether a user for which the authentication is successful is a legitimate user, the user is authenticated as the legitimate user, and a completion of the authentication is displayed in the operation display unit, and wherein if the lost user-specific certificate is used in the predetermined period of time it is determined that the user for which the authentication is successful is the legitimate user, and the completion of the authentication is displayed in the operation display unit.

2. The peripheral device as claimed in claim 1, wherein the predetermined process is an encryption of a communication path.

3. The peripheral device as claimed in claim 1, wherein the predetermined process is an authentication check of credibility and/or legitimacy of electronic data.

4. The peripheral device as claimed in claim 1, wherein the communication-function-equipped device stores therein information about a plurality of certificates.

5. The peripheral device as claimed in claim 4, wherein the central processing unit links the certificates to respective encryption strengths for control purposes.

6. The peripheral device as claimed in claim 5, wherein the central processing unit links the certificates to respective processing performances of use of the certificates for control purposes.

7. The peripheral device as claimed in claim 5, comprising the operation display unit configured to be operated by the user, wherein the information about the plurality of certificates is displayed on the operation display unit, thereby allowing the user to select one of the certificates on the operation display unit.

8. The peripheral device as claimed in claim 4, comprising the operation display unit configured to be operated by the user, wherein the operation display unit displays an expiration date or information about disabled status with respect to the certificates.

9. The peripheral device as claimed in claim 8, wherein the operation display unit displays information about an update or reissue of a given certificate, and allows the user to perform a procedure to update or reissue the given certificate.

10. The peripheral device as claimed in claim 1, wherein the central processing unit adds a record of use of an application to a history of certificate uses in response to the application being used by using the certificate, and stores therein the history of certificate uses.

11. The peripheral device as claimed in claim 1, wherein the peripheral device is one of a printer, a scanner, and a facsimile, or a digital multifunctional device equipped with at least two functionalities of the printer, the scanner, and the facsimile, or a personal computer, and wherein the communication-function-equipped device is one of an IC card, an RFID, an NFC-R/W, and a mobile terminal.

12. The peripheral device as claimed in claim 1, wherein the peripheral device is configured to display a history of previous uses of the certificate, execute the predetermined process by using the certificate, and add a history of use of the certificate to the first and second histories.

13. The peripheral device as claimed in claim 1, wherein the communication-function-equipped device is a near field communication token.

14. The peripheral device as claimed in claim 1, wherein the local interface is a near field communication R/W.

15. A network system, comprising:
a network including one of a wired LAN and a wireless LAN; and
a peripheral device connected to the network,
wherein the peripheral device includes:
an interface for connection to a wired or wireless LAN;
a local interface for wireless connection; and
a central processing unit configured to check a legitimacy of a user based on a user-specific certificate stored in a communication-function-equipped device upon being accessed through the local interface by the communication-function-equipped device using near-field wireless communication, and to allow a predetermined process to be performed upon successful authentication of the legitimacy,
wherein the central processing unit is configured to allow the user to decide whether a process of disabling a lost user-specific certificate is performed when the lost user-specific certificate is used,
wherein, when the process of disabling the lost user-specific certificate is performed, the peripheral device displays a notification for a disabled user-specific certificate on an operation display unit of the peripheral device, and registers a disabled status in the user-specific certificate,
wherein, when the process of disabling the lost user-specific certificate is not performed, the authentication of the legitimacy is performed by the lost user-specific certificate, and a history of use of the lost user-specific certificate is checked upon establishing a successful authentication,
wherein the central processing unit is further configured to determine whether the lost user-specific certificate is used in a predetermined period of time based on the history of the use of the lost user-specific certificate,
wherein if the lost user-specific certificate is not used in the predetermined period of time it is determined whether a user for which the authentication is successful is a legitimate user, the user is authenticated as the legitimate user, and a completion of the authentication is displayed in the operation display unit, and
wherein if the lost user-specific certificate is used in the predetermined period of time it is determined that the user for which the authentication is successful is the legitimate user, and the completion of the authentication is displayed in the operation display unit.

16. A method of processing communication for a peripheral device which includes an interface for connection to a wired or wireless LAN and a local interface for wireless connection, the method comprising:
checking a legitimacy of a user based on a user-specific certificate stored in a communication-function-equipped device upon being accessed through the local interface by the communication-function-equipped device using near-field wireless communication; and
allowing a predetermined process to be performed upon successful authentication of the legitimacy,
wherein the method further comprises allowing the user to decide whether a process of disabling a lost user-specific certificate is performed when the lost user-specific certificate is used,
wherein, when the process of disabling the lost user-specific certificate is performed, the peripheral device displays a notification for a disabled user-specific certificate on an operation display unit of the peripheral device, and registers a disabled status in the user-specific certificate,
wherein, when the process of disabling the lost user-specific certificate is not performed, the authentication of the legitimacy is performed by the lost user-specific certificate, and a history of use of the lost user-specific certificate is checked upon establishing a successful authentication,
wherein the central processing unit is further configured to determine whether the lost user-specific certificate is used in a predetermined period of time based on the history of the use of the lost user-specific certificate,
wherein if the lost user-specific certificate is not used in the predetermined period of time it is determined whether a user for which the authentication is successful is a legitimate user, the user is authenticated as the legitimate user, and a completion of the authentication is displayed in the operation display unit, and
wherein if the lost user-specific certificate is used in the predetermined period of time it is determined that the user for which the authentication is successful is the legitimate user, and the completion of the authentication is displayed in the operation display unit.

* * * * *